United States Patent
Tsushima et al.

[11] Patent Number: 6,072,693
[45] Date of Patent: Jun. 6, 2000

[54] ELECTRIC DOUBLE LAYER CAPACITOR AND SEPARATOR THEREFOR

[75] Inventors: Manabu Tsushima; Takeshi Morimoto; Kazuya Hiratsuka; Takeshi Kawasato; Manabu Suhara, all of Yokohama, Japan

[73] Assignee: Asahi Glass Company Ltd., Tokyo, Japan

[21] Appl. No.: 09/184,337

[22] Filed: Nov. 2, 1998

[51] Int. Cl.[7] .................................................. H01G 9/145
[52] U.S. Cl. ............................................................ 361/502
[58] Field of Search ..................... 361/502, 512; 607/5, 4; 479/57, 59; 6361/504, 508, 512

[56] References Cited

U.S. PATENT DOCUMENTS

| | | | |
|---|---|---|---|
| 4,725,926 | 2/1988 | Morimoto et al. | 361/433 |
| 4,862,328 | 8/1989 | Morimoto et al. | 361/502 |
| 5,510,211 | 4/1996 | Sundberg | 429/210 |
| 5,707,756 | 1/1998 | Inuoe | 429/57 |
| 5,926,361 | 7/1999 | Alford | 361/502 |

FOREIGN PATENT DOCUMENTS

| | | |
|---|---|---|
| WO 97/11501 | 3/1997 | WIPO . |
| WO 98/00875 | 1/1998 | WIPO . |

*Primary Examiner*—Kristine Kincaid
*Assistant Examiner*—Mohamed El Gazzar
*Attorney, Agent, or Firm*—Oblon, Spivak, McClelland, Maier & Neustadt, P.C.

[57] ABSTRACT

An electric double layer capacitor having an electrolyte solution impregnated to an element including a positive electrode and a negative electrode facing each other with a separator interposed therebetween, wherein an electrode containing a carbon material having a specific surface area of at least 500 $m^2/g$ is used as the positive electrode and/or the negative electrode, and the separator is made of a glass fiber sheet containing from 2 to 60 wt % of glass fibers having fiber diameters of at most 1 $\mu m$.

17 Claims, 1 Drawing Sheet

ELECTRIC DOUBLE LAYER CAPACITOR AND SEPARATOR THEREFOR

BACKGROUND OF THE INVENTION

1. Field of the Invention

The present invention relates to an electric double layer capacitor having a small internal resistance and having the voltage-holding property improved.

2. Discussion of Background

Heretofore, as a separator for an electric double layer capacitor, a polyethylene non-woven fabric, a polypropylene non-woven fabric, a polyester non-woven fabric, kraft paper, a Manila hemp sheet or a glass fiber sheet has been known (JP-A-1-283811, JP-A-1-304719, etc.). The role of the separator is to electrically insulate the positive electrode from the negative electrode and to facilitate movement of ions in the electrolyte solution which takes place along with charging and discharging.

In recent years, an attention has been drawn to an electric double layer capacitor for heavy-current charging and discharging. However, with a separator made of the above-mentioned paper or non-woven fabric made of organic fibers, the liquid-maintaining property and the absorptivity for the electrolyte solution are inadequate, and the ion conductivity is low so that the internal resistance tends to be large. Accordingly, when instantaneous heavy-current discharge (which is one of characteristics of the electric double layer capacitor of this type), was carried out, the voltage drop was so large that the operation was impractical. Further, the liquid-maintaining property and the absorptivity for the electrolyte solution were inadequate, and the separator was likely to dry up and thus to lead to deterioration of the performance.

On the other hand, with a separator made of a glass fiber sheet, the fiber diameter is usually small as compared with organic fibers, and such a separator is excellent in wettability to the electrolyte solution and is accordingly excellent in the liquid-maintaining property and the absorptivity. Accordingly, when the separator made of a glass fiber sheet is employed, the ion conductivity will be large, and the internal resistance of the electric double layer capacitor can be made low. Further, the glass fibers do not fuse like synthetic fibers even at a high temperature and thus have a merit that the internal short circuiting due to fusion of the separator, will not occur even when the capacitor is used at a high temperature. However, glass fibers constituting the conventional glass fiber sheet are composed mainly of glass fibers having fiber diameters of at least 10 $\mu$m, and the liquid-maintaining property and the liquid absorptivity are not adequate, although they are better as compared with those of the separator made of organic fibers, and deterioration in the performance of the capacitor was still likely due to drying up of the separator.

Further, with the separator of a sheet made of thick glass fibers having fiber diameters of at least 10 $\mu$m, void pores are large, and fine particles of activated carbon used for an electrode can easily pass through the separator. Accordingly, charged activated carbon particles are likely to move to a counter electrode side by electrophoresis and consequently lose electric charge, thus leading to selfdischarge.

SUMMARY OF THE INVENTION

It is an object of the present invention to solve the above-mentioned problems in the prior art and to provide an electric double layer capacitor which has a separator excellent in the liquid-maintaining property and the absorptivity for an electrolyte solution and which has a low internal resistance and is excellent in the voltage-holding property.

The present invention provides an electric double layer capacitor having an electrolyte solution impregnated to an element comprising a positive electrode and a negative electrode facing each other with a separator interposed therebetween, wherein an electrode containing a carbon material having a specific surface area of at least 500 m$^2$/g is used as the positive electrode and/or the negative electrode, and the separator is made of a glass fiber sheet containing from 2 to 60 wt % of glass fibers having fiber diameters of at most 1 $\mu$m, and a separator therefor.

DETAILED DESCRIPTION OF THE PREFERRED EMBODIMENTS

Figure 1:
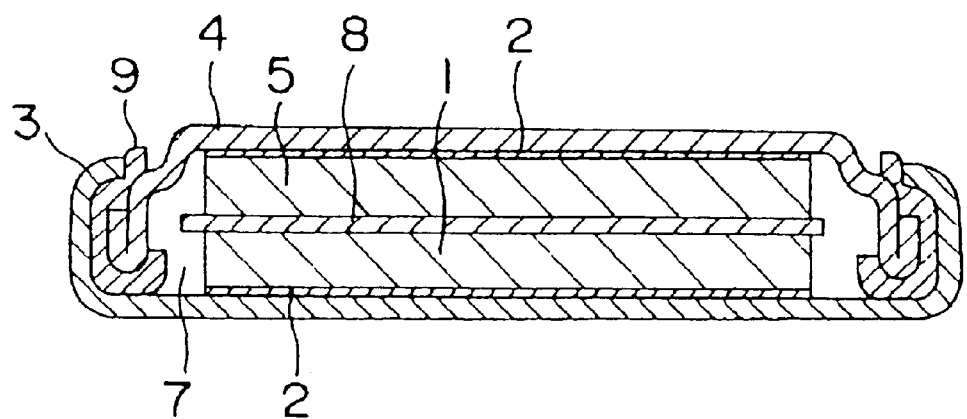
FIG. 1 is a vertical cross-sectional view schematically illustrating an embodiment of a coin type electric double layer capacitor of the present invention.

In the present invention, the glass fiber sheet for the separator contains from 2 to 60 wt % of glass fibers having fiber diameters of at most 1 $\mu$m. As glass fibers having such fine fiber diameters are contained, the glass fiber sheet is excellent in the liquid-maintaining property and the liquid absorptivity for an electrolyte solution, and it is accordingly possible to obtain an electric double layer capacitor having a small internal resistance. On the other hand, if glass fibers having fiber diameters of at most 1 $\mu$m are contained in an amount exceeding 60 wt%, the strength of the glass fiber sheet tends to deteriorate, and microshort circuiting between the positive and negative electrodes tends to occur, whereby the voltage-holding property tends to be poor. It is particularly preferred that glass fibers having fiber diameters of at most 1 $\mu$m are contained in an amount of from 5 to 45 wt%.

Further, the fiber diameters of glass fibers constituting the glass fiber sheet for the separator are preferably not more than 10 $\mu$m at the maximum. If the glass fiber sheet contains glass fibers having fiber diameters exceeding 10 $\mu$m, the resistance of the separator portion tends to be high, and the internal resistance of the electric double layer capacitor tends to be high. The average fiber diameter of the glass fibers is preferably from 0.5 to 5 $\mu$m. If the average fiber diameter is smaller than 0.5$\mu$m, the strength of the glass fiber sheet tends to be weak, and microshort circuiting between the positive and negative electrodes tends to occur. Further, if the average fiber diameter exceeds 5 $\mu$m, the resistance at the separator portion tends to be high, and the internal resistance of the electric double layer capacitor tends to be high. It is particularly preferred that the average fiber diameter is from 1.0 to 4.0 $\mu$m.

The basis weight of the glass fiber sheet is preferably at most 200 g/m$^2$, particularly preferably from 10 to 50 g/m$^2$. If the basis weight of the glass fiber sheet is large, the internal resistance of the electric double layer capacitor tends to be high, and it tends to be difficult to obtain a high power. On the other hand, if the basis weight is small, the strength of the glass fiber sheet tends to be weak.

The porosity of the glass fiber sheet is preferably rom 60 to 95%. If it is less than 60%, the electrolyte solution can not adequately be maintained. On the other hand, if it exceeds 95%, the strength of the glass fiber sheet tends to be weak, and its handling during the process for producing an electric double layer capacitor tends to be difficult. Particularly preferably, the porosity is from 70 to 90%. Further, the maximum pore diameter of the glass fiber sheet is preferably not larger than 20 μm. If it is not larger than 20 μm, deterioration in the voltage-holding property due to movement of the fine particles of activated carbon from the electrode to the counter electrode side by electrophoresis, tends to scarcely take place.

The glass fiber sheet to be used in the present invention, may be a woven fabric or a non-woven fabric, and it is preferably a sheet prepared by a conventional sheet-forming method. As the glass fibers constituting the sheet, it is preferred to use glass short fibers having relatively short lengths, prepared by e.g. a flame method or a centrifugal method. Glass fibers are usually dispersed in an aqueous solution having a binder added as the case requires, to obtain a slurry, and the slurry is supplied to a sheet forming machine to prepare a glass fiber sheet. The prepared glass fiber sheet may be subjected to pressing or the like to adjust the thickness.

The composition of the glass fibers is not particularly limited, but, for example, a glass composition of soda lime type can preferably be used, and in order to facilitate fiber forming, a component such as $B_2O_3$ may be incorporated.

The thickness of the separator is preferably at most 1 mm. However, in order to minimize the internal resistance of the electric double layer capacitor and to obtain adequate strength for handling during the production, the thickness is more preferably from 30 to 200 μm. As the adequate strength for handling during the production, the tensile strength of the separator is preferably at least 0.10 kN/m.

The glass fiber sheet in the present invention is preferably a sheeted paper prepared without using a binder, from the viewpoint of the liquid-maintaining property and the absorptivity for the electrolyte solution and reduction of electric resistance. However, in order to increase the capacitance per unit volume of an electric double layer capacitor, it is effective to reduce the volume of an element which is not related to the capacitance. From this viewpoint, the thickness of the glass fiber sheet should preferably be thin. However, the thinner the thickness of the glass fiber sheet, the weaker the strength of the sheet. Therefore, in a case where the thickness of the glass fiber sheet is thin, it is preferred to incorporate a binder such as a resin as the case requires, in order to improve the strength. As a binder to be used here, polyvinyl alcohol or polyvinylidene fluoride may, for example, be specifically mentioned.

The electric double layer capacitor of the present invention is one having an electrolyte solution impregnated to an element having a separator disposed between a positive electrode and a negative electrode. The positive electrode and/or the negative electrode is composed mainly of a carbon material having a specific surface area of at least 500 $m^2/g$. The carbon material is preferably the one having a specific surface area of from 100 to 2,000 $m^2/g$, whereby the capacitance per unit volume can be made large. The carbon material may, for example, be activated carbon, carbon black or polyacene. It is particularly preferred to employ activated carbon powder. It is more preferred to use it in combination with highly conductive carbon black as a conductive material. In such a case, the conductive material is preferably incorporated in an amount of from 5 to 20 wt% in the electrode.

The electrode in the present invention preferably contains a fluorine-containing resin as a binder. Particularly preferred is polytetrafluoroethylene, since it has heat resistance and chemical resistance and is capable of imparting strength to the electrode even in a small amount in the form of fibers, and it scarcely hinders the conductivity of the electrode. From the viewpoint of the balance between the strength of the electrode and the conductivity, the binder is preferably contained in an amount of from 5 to 20 wt % in the electrode.

The current collector which electrically connects the above electrode may be any material so long as it is excellent in electric conductivity and electrochemically durable, and a valve metal such a aluminum, titanium or tantalum, stainless steel, a noble metal such as gold or platinum, or a carbon type material such as a conductive rubber containing graphite, glassy carbon or carbon black, may preferably be used. Particularly preferred is aluminum, since it is light in weight, excellent in electric conductivity and electrochemically stable.

It is preferred that the electrode is formed into a sheet shape and then bonded to the current collector by means of a conductive adhesive. As a method for preparing the electrode, for example, a mixture comprising activated carbon powder, carbon black, a fluorine-containing resin and a liquid lubricant, is kneaded and then rolled to form it into a sheet shape. The obtained sheet-shaped electrode is placed on the side of a current collector on which a conductive adhesive has preliminarily been coated, followed by pressbonding and heat drying preferably at a high temperature of at least 200° C., more preferably under reduced pressure, whereby the conductive adhesive is cured to firmly bond the current collector and the electrode. To improve the productivity of the electrode, it is further preferred to carry out drying unde reduced pressure at a temperature of from 200 to 260° C.

Otherwise, the elctrode may be prepared in such a manner that a carbon material is dispersed in a solution having a fluorine containing resin dissolved in a solvent, to obtain a slurry, and the slurry is coated on a current collector in such a case, it is preferred that the slurry is coated on the side of the current collector on which a conductive adhesive has preliminary been coated, followed by heat drying at a high temperature of at leas 200° C., particularly preferably under reduced pressure.

In the present invetion, the above electrode may be used for both the positive electrode and the negative electrode. However, the above electrode may be used for either the positive elctrode or the negative electrode, and an electrically chargeable and dischargeable non-polar electrode material i.e. an active material for a secondary cell, may be used as the main component for the other electrode.

As the electrolyte solution to be used for an electric double layer capacitor, an aqueous electrolyte solution and a non-aque us electrolyte solution employing an organic solvent, are available, and the former has a withstand voltage of ab ut 0.8 V, and the latter has a withstand voltage of ab ut 2.5 V. The electrostatic energy of an electric double layer capacitor is proportional to the square of the withstand voltage. Accordingly, when the aqueous and non-aqueous electrolyte solutions are compared, the latter is advantageous in that the energy density can be made about nine times as large.

The non-aqueous electrolyte solution is not particularly limited, and any known non-aqueous electrolyte solution containing a salt dissociable into ions in an organic solvent, can be used. It is particularly preferred to use an electrolytic solution having dissolved in an organic solvent, a salt comprising a quaternary onium cation represented by e.g. $R^1R^2R^3R^4N^+$ or $R^1R^2R^3R^4P^+$ (wherein each of $R^1$, $R^2$, $R^3$ and $R^4$ which are independent of one another, is a $C_{1-6}$ alkyl group) and an anion represented by e.g. $BF_4^-$, $PF_6^-$, $ClO_4^-$ or $CF_3SO_3^-$.

The organic solvent to be used for the non-aqueous electrolyte solution is preferably at least one member selected from the group consisting of cyclic carbonates such as ethylene carbonate, propylene carbonate and butylene carbonate, linear carbonates such as dimethyl carbonate, ethylmethyl carbonate and diethyl carbonate, sulforane and sulforane derivatives.

The electric double layer capacitor of the present invention can be applied to a wide range covering from a capacitor of a relatively small size such as a coin type electric double layer capacitor having a pair of electrodes facing to each other with a separator interposed therebetween, accommodated in a coin-type container, to one for ultra large capacitance or heavy current, having a discharge capacitance of from 50 to 20,000 F or a discharge current of from 1 to 1,000 A.

The structure for the large size electric double layer capacitor may preferably be one wherein a pair of electrodes are rolled with a separator interposed therebetween to obtain an element, which is then accommodated in a cylindrical casing together with an electrolyte solution, or one wherein a plurality of rectangular positive and negative electrodes are alternately laminated with a separator interposed therebetween to form an element, which is then accommodated in a prismatic cell together with an electrolyte solution. In such a large size structure, the electrodes and the separator are intimately laminated. However, with the electric double layer capacitor of the present invention, the separator is excellent not only in the liquid-maintaining property and the absorptivity for the electrolyte solution but also in the impregnation property, and thus, an electric double layer capacitor can be produced with good productivity even when an electrolyte solution having a relatively high viscosity is impregnated after forming the element.

Now, present invention will be described in further detail with reference to Examples (Examples 1 to 9) of the present invention and Comparative Examples (Examples 10 to 14). However, it should be understood that the present invention is by no means restricted by such specific Examples.

EXAMPLE 1

A mixture comprising 80 wt % of activated carbon having a specific surface area of 1,500 m$^2$/g, 10 wt % of carbon black and 10 wt % of polytetrafluoroethylene, was kneaded and then rolled to form a sheet having a thickness of 0.5 mm, which was cut into two disks having a diameter of 1.2 mm to obtain a pair of electrodes 1 and 5. These electrodes 1 and 5 were bonded to a metal casing 3 and a cover 4, respectively, by means of a conductive adhesive 2, followed by drying.

As a separator 8 interposed between the electrodes 1 and 5, a sheeted paper of glass short fibers having an average fiber diameter of 2.3 $\mu$m and a maximum fiber diameter of 5 $\mu$m and containing 8 wt % of glass fibers having fiber diameters of at most 1 $\mu$m (thickness: 160 $\mu$m, basis weight: 36.4 g/m$^2$, porosity: 79.9%, maximum pore diameter: 11 $\mu$m, tensile strength: 0.31 kN/m) was employed. As a non-aqueous electrolyte solution 7 to be impregnated to the electrodes and the separator, a propylene carbonate solution containing 1.0 mol/L of tetraethylammonium tetrafluoroborate, was employed, and the electrode 1 and the electrode 5 were disposed to face each other with the separator 8 interposed therebetween, and the casing 3 and the cover 4 were caulked and sealed with an insulating packing 9 interposed therebetween, to obtain a coin type electric double layer capacitor as shown in FIG. 1.

The initial internal resistance and the discharge capacitance of this electric double layer capacitor were measured, and the capacitor was charged to 2.5 V over a period of 30 minutes and then left to stand for 50 hours in an open-circuit state, whereupon the voltage was measured. Thereafter, it was placed in a constant temperature chamber of 70° C., and a voltage of 2.5 V was applied for 1,000 hours, whereupon the internal resistance and the capacitance were measured again. The measurements of the internal resistance and the capacitance were carried out at a current of 0.2 mA. The results are shown in Table 1.

EXAMPLE 2

An electric double layer capacitor was prepared in the same manner as in Example 1 except that as the separator, a sheeted paper made of glass short fibers having an average fiber diameter of 1.45 $\mu$m and a maximum fiber diameter of 5 $\mu$m and containing 25 wt % of glass fibers having fiber diameters of at most 1 $\mu$m (thickness: 160 $\mu$m, basis weight: 34.2 g/m$^2$, porosity: 84.0%, maximum pore diameter: 9$\mu$m, tensile strength: 0.33 kN/m) was employed, and evaluated in the same manner as in Example 1. The results are shown in Table 1.

EXAMPLE 3

An electric double layer capacitor was prepared in the same manner as in Example 1 except that as the separator, a sheeted paper made of glass short fibers having an average fiber diameter of 1.28 $\mu$m and a maximum fiber diameter of 5 $\mu$m and containing 40 wt % of glass fibers having fiber diameters of at most 1 $\mu$m (thickness: 160$\mu$m, basis weight: 31.3 g/m$^2$, porosity: 87.1%, maximum pore diameter: 8 $\mu$m, tensile strength: 0.28 kN/m) was employed, and evaluated in the same manner as in Example 1. The results are shown in Table 1.

EXAMPLE 4

An electric double layer capacitor was prepared in the same manner as in Example 1 except that as the separator, a sheeted paper made of glass short fibers having an average fiber diameter of 2.48 $\mu$m and a maximum fiber diameter of 5 $\mu$m and containing 3 wt % of glass fibers having fiber diameters of at most 1 $\mu$m (thickness: 160 $\mu$m, basis weight: 36.8 g/m$^2$, porosity: 76.0%, maximum pore diameter: 14$\mu$m, tensile strength: 0.33 kN/m) was employed, and evaluated in the same manner as in Example 1. The results are shown in Table 1.

EXAMPLE 5

An electric double layer capacitor was prepared in the same manner as in Example 1 except that as the separator, a sheeted paper made of glass short fibers having an average fiber diameter of 1.11 $\mu$m and a maximum fiber diameter of 5 $\mu$m and containing 50 wt % of glass fibers having fiber diameters of at most 1 $\mu$m (thickness: 160$\mu$m, basis weight: 31.0 g/m$^2$, porosity: 91.5%, maximum pore diameter: 6$\mu$m, tensile strength: 0.25 kN/m) was employed, and evaluated in the same manner as in Example 1. The results are shown in Table 1.

EXAMPLE 6

An electric double layer capacitor was prepared in the same manner as in Example 1 except that as the separator, a sheeted paper made of glass short fibers having an average fiber diameter of 1.14 $\mu$m and a maximum fiber diameter of 5 μm and containing 50 wt % of glass fibers having fiber diameters of at most 1 μm (thickness: 120μm, basis weight: 21.0 g/m², porosity: 89.6%, maximum pore diameter: 14 μm, tensile strength: 0.12 kN/m) was employed, and evaluated in the same manner as in Example 1. The results are shown in Table 1.

EXAMPLE 7

An electric double layer capacitor was prepared in the same manner as in Example 1 except that as the separator, a sheeted paper made of glass short fibers having an average fiber diameter of 1.29 μm and a maximum fiber diameter of 4 μm and containing 30 wt % of glass fibers having fiber diameters of at most 1 μm (thickness: 90μm, basis weight: 16.0 g/m², porosity: 85.4%, maximum pore diameter: 17 μm, tensile strength: 0.10 kN/m) was employed, and evaluated in the same manner as in Example 1. The results are shown in Table 1.

EXAMPLE 8

A pair of electrodes were prepared in the same manner as in Example 1 except that instead of activated carbon having a specific surface area of 1,500 m²/g, activated carbon having a specific surface area of 1,800 m²/g was used. An electric double layer capacitor was prepared in the same manner as in Example 1 except that as the electrolyte solution, a solution having 1.6 mol/kg of triethylmonomethylammonium tetrafluoroborate dissolved in a solvent mixture of sulforane and ethylmethyl carbonate (weight ratio of 8:2) was employed and the above electrode was employed.

The initial internal resistance and the capacitance of this electric double layer capacitor were measured, and the capacitor was charged to 3.0 V over a period of 30 minutes and then left to stand for 50 hours in an open-circuit state, whereupon the voltage was measured. Thereafter, it was placed in a constant temperature chamber of 70° C., and a voltage of 3.0 V was applied for 1,000 hours, whereupon the internal resistance and the capacitance were measured again. The measurements of the internal resistance and the capacitance were carried out at a current of 0.2 mA. The results are shown in Table 1.

EXAMPLE 9

A mixture comprising 80 wt % of activated carbon having a specific surface area of 2,000 m²/g, 10 wt % of carbon black and 10 wt % of polytetrafluoroethylene, were kneaded and then, rolled to form a sheet having a thickness of 0.2 mm, from which 60 electrode sheets of 6 cm×10 cm were prepared. These electrode sheets were bonded by means of a conductive adhesive to both sides of an aluminum foil current collector having a lead portion and having a thickness of 0.04 mm and a size of 6 cm×10 cm. 30 sheets of such an assembly were prepared, and among them, 15 sheets were used as positive electrodes, and the remaining 15 sheets were used as negative electrodes.

Employing the same sheeted paper of glass short fibers as used in Example 1 as the separator, the above positive electrodes and the above negative electrodes were alternately laminated with the separator interposed therebetween, to obtain an element, which was accommodated in a bottomed angular container and dried. Then, a propylene carbonate solution having 1.5 mol/L of triethylmonomethyl tetrafluoroborate dissolved therein, was impregnated as an electrolyte solution to the above element, and the container was sealed to obtain an electric double layer capacitor.

The initial internal resistance and the capacitance of this electric double layer capacitor were measured, and the capacitor was charged to 2.5 V over a period of 24 hours and then left to stand for 50 hours in an open-circuit state, whereupon the voltage was measured. Thereafter, it was placed in a constant temperature chamber of 70° C., and a voltage of 2.0 V was applied for 1,000 hours, whereupon the internal resistance and the capacitance were measured again. The measurements of the internal resistance and the capacitance were carried out at a current of 50 A. the results are shown in Table 1.

EXAMPLE 10 (COMPARATIVE)

An electric double layer capacitor was prepared in the same manner as in Example 1 except that as the separator, a polypropylene non-woven fabric made of fibers having an average fiber diameter of 2.5 μm and having a thickness of 150μm, a basis weight of 50.8 g/m², a porosity of 57.4%, a maximum pore diameter of 5 am and a tensile strength of 1.42 kN/m, was employed, and evaluated in the same manner as in Example 1. The results are shown in Table 1.

EXAMPLE 11 (COMPARATIVE)

An electric double layer capacitor was prepared in the same manner as in Example 1 except that as the separator, a Manila hemp sheet made of fibers having an average fiber diameter of 20 μm and having a thickness of 70 μm, a basis weight of 28.1 g/m², a porosity of 52.4%, a maximum pore diameter of 17 μm and a tensile strength of 0.26 kN/m, was employed, and evaluated in the same manner as in Example 1. The results are shown in Table 1.

EXAMPLE 12 (COMPARATIVE)

An electric double layer capacitor was prepared in the same manner as in Example 1 except that as the separator, a sheeted paper made of glass fibers having an average fiber diameter of 1.01 μm and a maximum fiber diameter of 5 μm and containing 75 wt % of glass fibers having fiber diameters of at most 1 μm (thickness: 160 μm, basis weight: 30.1 g/m², porosity: 94.1%, maximum pore diameter: 12μm, tensile strength: 0.21 kN/m) was employed, and evaluated in the same manner as in Example 1. The results are shown in Table 1.

EXAMPLE 13 (COMPARATIVE)

An electric double layer capacitor was prepared in the same manner as in Example 8 except that instead of the glass fiber sheet, the same separator as used in Example 10, was employed, and evaluated in the same manner as in Example 8. The results are shown in Table 1.

EXAMPLE 14 (COMPARATIVE)

An electric double layer capacitor was prepared in the same manner as in Example 9 except that instead of the glass fiber sheet, the same separator as used in Example 11, was employed, and evaluated in the same manner as in Example 9. The results are shown in Table 1.

The sheeted paper made of glass short fibers used in each of Examples 1 to 9 and 12 to 14 was one prepared in such a manner that short fibers prepared by a flame blowing method from a glass having a composition comprising 65 wt % of $SiO_2$, 16 wt % of $Na_2O$, 6 wt % of $B_2O_3$, 6 wt % of CaO, 4 wt % of $Al_2O_3$ and 3 wt % of MgO, were dispersed in water and sheeted by a sheeting method.

TABLE 1

| | Initial | | Voltage | After 1,000 hours at 70° C. | | |
|---|---|---|---|---|---|---|
| | Internal resistance ($\Omega$) | Capacitance (F) | after 50 hours (V) | Applied voltage (V) | Internal resistance ($\Omega$) | Change in capacitance (%) |
| Example 1 | 10.8 | 0.49 | 2.25 | 2.5 | 17.6 | −15.3 |
| Example 2 | 10.5 | 0.49 | 2.24 | 2.5 | 17.6 | −14.3 |
| Example 3 | 10.1 | 0.50 | 2.22 | 2.5 | 16.9 | −14.1 |
| Example 4 | 11.2 | 0.50 | 2.25 | 2.5 | 18.2 | −13.2 |
| Example 5 | 10.0 | 0.50 | 2.03 | 2.5 | 16.8 | −15.3 |
| Example 6 | 9.6 | 0.51 | 2.23 | 2.5 | 17.3 | −14.9 |
| Example 7 | 9.1 | 0.50 | 2.20 | 2.5 | 17.8 | −15.1 |
| Example 8 | 14.6 | 0.55 | 2.71 | 3.0 | 23.5 | −15.8 |
| Example 9 | 0.003 | 1520 | 2.28 | 2.0 | 0.004 | −16.9 |
| Example 10 | 15.6 | 0.48 | 1.67 | 2.5 | 25.4 | −28.7 |
| Example 11 | 19.6 | 0.46 | 1.26 | 2.5 | 36.2 | −35.3 |
| Example 12 | 9.9 | 0.50 | 1.88 | 2.5 | 16.7 | −18.2 |
| Example 13 | 20.8 | 0.52 | 2.01 | 3.0 | 44.3 | −27.4 |
| Example 14 | 0.004 | 1490 | 1.61 | 2.0 | 0.007 | −31.5 |

According to the present invention, it is possible to obtain an electric double layer capacitor having a low internal resistance and an excellent voltage-holding property, as the separator made of a glass fiber sheet is excellent in the liquid-maintaining property and the absorptivity for the electrolyte solution. The electric double layer capacitor of the present invention is useful for a wide range covering from a capacitor of a relatively small size such as a coin type electric double layer capacitor, to an electric double layer capacitor for ultra large capacitance or for heavy current, which has a capacitance of from 50 to 20,000 F or a discharge current of from 1 A to 1,000 A.

What is claimed is:

1. An electric double layer capacitor having an electrolyte solution impregnated to an element comprising a positive electrode and a negative electrode facing each other with a separator interposed therebetween, wherein an electrode containing a carbon material having a specific surface area of at least 500 m$^2$/g is used as the positive electrode and/or the negative electrode, and the separator is made of a glass fiber sheet containing from 2 to 60 wt % of glass fibers having fiber diameters of at most 1 $\mu$m.

2. The electric double layer capacitor according to claim 1, wherein the glass fiber sheet contains glass fibers having an average fiber diameter of from 0.5 to 5 $\mu$m.

3. The electric double layer capacitor according to claim 1, wherein the glass fiber sheet has a porosity of from 60 to 95% and a thickness of from 30 to 200 $\mu$m.

4. The electric double layer capacitor according to claim 1, wherein the glass fiber sheet is a porous sheet having a maximum pore diameter of at most 20 $\mu$m.

5. The electric double layer capacitor according to claim 1, wherein the glass fiber sheet has a basis weight of from 10 to 50 g/m$^2$.

6. The electric double layer capacitor according to claim 1, wherein the glass fiber sheet is a sheet made of glass short fibers.

7. The electric double layer capacitor according to claim 1, wherein the electrolyte solution is a non-aqueous electrolyte solution.

8. The electric double layer capacitor according to claim 7, wherein the solvent of the electrolyte solution is at least one member selected from the group consisting of ethylene carbonate, propylene carbonate, butylene carbonate, dimethyl carbonate, ethylmethyl carbonate, diethyl carbonate, sulforane and a sulforane derivative.

9. The electric double layer capacitor according to claim 7, wherein the electrolyte solution contains, as an electrolyte, a salt comprising a quaternary onium cation of the formula $R^1R^2R^3R^4N^+$ or $R^1R^2R^3R^4P^+$ wherein each of $R^1$, $R^2$, $R^3$ and $R^4$ which are independent of one another, is a $C_{1-6}$ alkyl group, and an anion of the formula $BF_4^-$, $PF_6^-$, $ClO_4^-$ or $CF_3SO_3^-$.

10. The electric double layer capacitor according to claim 1, wherein at least one electrode comprises activated carbon, conductive carbon black and a binder.

11. The electric double layer capacitor according to claim 10, wherein the binder comprises polytetrafluoroethylene.

12. A separator for an electric double layer capacitor, which is made of a glass fiber sheet containing from 2 to 60 wt % of glass fibers having fiber diameters of at most 1 $\mu$m.

13. The separator for an electric double layer capacitor according to claim 12, wherein the glass fiber sheet contains glass fibers having an average fiber diameter of from 0.5 to 5 $\mu$m.

14. The separator for an electric double layer capacitor according to claim 12, wherein the glass fiber sheet has a porosity of from 60 to 95% and a thickness of from 30 to 200 $\mu$m.

15. The separator for an electric double layer capacitor according to claim 12, wherein the glass fiber sheet is a porous sheet having a maximum pore diameter of at most 20 $\mu$m.

16. The separator for an electric double layer capacitor according to claim 12, wherein the glass fiber sheet has a basis weight of from 10 to 50 g/m$^2$.

17. The separator for an electric double layer capacitor according to claim 12, wherein the glass fiber sheet is a sheet made of glass short fibers.

* * * * *